(12) United States Patent
Porembski (10) Patent No.: US 9,948,760 B2
(45) Date of Patent: Apr. 17, 2018

(54) SYSTEM AND METHOD FOR CONTROLLING VEHICLE NETWORK FUNCTIONS WITH VERSION CONTROL

(71) Applicant: Honda Motor Co., Ltd., Tokyo (JP)

(72) Inventor: Joseph P. Porembski, Columbus, OH (US)

(73) Assignee: Honda Motor Co., Ltd., Tokyo (JP)

( * ) Notice: Subject to any disclaimer, the term of this patent is extended or adjusted under 35 U.S.C. 154(b) by 168 days.

(21) Appl. No.: 14/751,249

(22) Filed: Jun. 26, 2015

(65) Prior Publication Data

US 2016/0381197 A1    Dec. 29, 2016

(51) Int. Cl.
| | | |
|---|---|---|
| H04L 29/08 | (2006.01) | |
| H04M 1/725 | (2006.01) | |
| H04M 1/60 | (2006.01) | |

(52) U.S. Cl.
CPC ........ *H04M 1/72527* (2013.01); *H04L 67/12* (2013.01); *H04M 1/6083* (2013.01); *H04M 1/72533* (2013.01)

(58) Field of Classification Search
CPC .. H04W 4/005; H04W 28/0215; H04L 67/12; H04M 1/72527
USPC .................................................. 455/419–420
See application file for complete search history.

(56) References Cited

U.S. PATENT DOCUMENTS

| | | | |
|---|---|---|---|
| 6,052,707 A | 4/2000 | D'Souza | |
| 7,133,874 B2 | 11/2006 | Hill et al. | |
| 7,444,621 B2 | 10/2008 | Pletcher et al. | |
| 7,802,266 B2 | 9/2010 | Mathur et al. | |
| 8,463,696 B2 | 6/2013 | Sheldon | |
| 2009/0284476 A1* | 11/2009 | Bull | G06F 9/4445 345/173 |
| 2011/0219105 A1* | 9/2011 | Kryze | G06F 15/16 709/223 |
| 2013/0013148 A1* | 1/2013 | Park | G07C 5/00 701/36 |
| 2014/0222987 A1 | 8/2014 | Pearson et al. | |
| 2014/0280580 A1* | 9/2014 | Langlois | H04W 4/005 709/204 |

(Continued)

OTHER PUBLICATIONS

Article: Sedlmair, M., et al.: "MostVis: An Interactive Visualization Supporting Automotive Engineers in MOST Catalog Exploration", printed Jun. 25, 2015, 10 pages.

(Continued)

*Primary Examiner* — Marcus Hammonds
(74) *Attorney, Agent, or Firm* — Rankin, Hill & Clark LLP (57) ABSTRACT

A method and system for controlling vehicle network functions and version control, includes providing a functional block framework at a vehicle computing device for controlling functional devices in a vehicle communication network system. Each functional device can include one or more functional objects. The method and system include providing one or more interfaces for each functional object, wherein each interface is defined with a set of features, the set of features selected from a feature catalog defined in the framework. The method and system include implementing the interfaces for each function object of each function device in the vehicle network communication system to enable communication over the vehicle network communication system.

13 Claims, 7 Drawing Sheets

(56) References Cited

U.S. PATENT DOCUMENTS

| | | | | |
|---|---|---|---|---|
| 2015/0373479 | A1* | 12/2015 | Xia ...................... | H04W 4/005 |
| | | | | 455/420 |
| 2016/0012727 | A1* | 1/2016 | Bostick ................. | G08G 1/166 |
| | | | | 340/903 |
| 2016/0198288 | A1* | 7/2016 | Burns .................... | H04L 67/12 |
| | | | | 455/41.2 |

OTHER PUBLICATIONS

Article: Weiss, G., et al.: "Towards Automotive Embedded Systems with Self-X Properties, New Trends and Developments in Automotive System Engineering" http:www.intechopen.com/books/new-trends-and-developments-in-automotive-system-engineering/towards-automotive-embedded-systems-with-self-xproperties Jan. 8, 2011, 23 pages.

* cited by examiner

SYSTEM AND METHOD FOR CONTROLLING VEHICLE NETWORK FUNCTIONS WITH VERSION CONTROL

BACKGROUND

Electronic devices that are part of a vehicle network communication system can perform various functions in the system. These electronic devices can communicate with the vehicle and one another over the network to perform the various functions. Further, these electronic devices can communicate with electronic devices associated with other vehicles. To facilitate communication and control of the various functions and features of each electronic device, the vehicle network communication system can implement frameworks for interfacing with the electronic devices.

BRIEF DESCRIPTION

According to one aspect, a computer-implemented method for controlling vehicle network functions and version control includes providing a functional block framework at a vehicle computing device for controlling functional devices in a vehicle communication network system. Each functional device includes one or more functional objects. The method includes providing one or more interfaces for each functional object, wherein each interface is defined with a set of features. The set of features is selected from a feature catalog defined in the framework. The method includes implementing the interfaces for each function object of each function device in the vehicle network communication system to enable communication over the vehicle network communication system.

According to another aspect, a system for controlling vehicle network functions and version control includes a vehicle communication network including functional devices, where each functional device includes one or more functional objects. The system includes a network interface operably connected for computer communication with the vehicle communication network and a vehicle computing device operably connected for computer communication with the network interface. The vehicle computing device includes a processor and a memory. The processor implements one or more interfaces for each functional object of each functional device detected on the vehicle communication network. Each interface is defined in a functional block framework stored on the memory and each interface includes a set of features. The features are selected from a feature catalog defined in the framework. The processor enables communication over the vehicle network communication system for the vehicle computing device and the functional devices using the interfaces.

According to a further aspect, an object oriented software architecture encoded on a non-transitory computer readable medium is provided for controlling vehicle network functions and version control, the architecture including at least an application layer and an application framework layer. The architecture includes an object oriented class allowing access and control of a functional device in a vehicle communication network system, the vehicle communication network system interfacing with the software architecture and the vehicle communication network including more than one functional device. The architecture includes a plurality of interfaces implemented by the class. Each interface is defined with a set of features, the set of features selected from a feature catalog in a set of libraries of the software architecture. Further, the architecture includes one or more applications enabling communication between the functional device and other functional devices using the interfaces via the object oriented class.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

DETAILED DESCRIPTION

The following includes definitions of selected terms employed herein. The definitions include various examples and/or forms of components that fall within the scope of a term and that can be used for implementation. The examples are not intended to be limiting.

A "bus," as used herein, refers to an interconnected architecture that is operably connected to other computer components inside a computer or between computers. The bus can transfer data between the computer components. The bus can be a memory bus, a memory controller, a peripheral bus, an external bus, a crossbar switch, and/or a local bus, among others. The bus can also be a vehicle bus that interconnects components inside a vehicle using protocols such as Media Oriented Systems Transport (MOST), Controller Area network (CAN), Local Interconnect Network (LIN), among others.

"Computer communication," as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "disk," as used herein can be, for example, a magnetic disk drive, a solid state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

A "memory," as used herein can include volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory can store an operating system that controls or allocates resources of a computing device.

A "module," as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

An "operable connection," or a connection by which entities are "operably connected," is one in which signals, physical communications, and/or logical communications can be sent and/or received. An operable connection can include a wireless interface, a physical interface, a data interface, and/or an electrical interface.

A "processor," as used herein, processes signals and performs general computing and arithmetic functions. Signals processed by the processor can include digital signals, data signals, computer instructions, processor instructions, messages, a bit, a bit stream, or other means that can be received, transmitted and/or detected. Generally, the processor can be a variety of various processors including multiple single and multicore processors and co-processors and other multiple single and multicore processor and co-processor architectures. The processor can include various modules to execute various functions.

A "vehicle," as used herein, refers to any moving vehicle that is capable of carrying one or more human occupants and is powered by any form of energy. The term "vehicle" includes, but is not limited to cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" can refer to an electric vehicle (EV) that is capable of carrying one or more human occupants and is powered entirely or partially by one or more electric motors powered by an electric battery. The EV can include battery electric vehicles (BEV) and plug-in hybrid electric vehicles (PHEV). The term "vehicle" can also refer to an autonomous vehicle and/or self-driving vehicle powered by any form of energy. The autonomous vehicle may or may not carry one or more human occupants. Further, the term "vehicle" can include vehicles that are automated or non-automated with pre-determined paths or free-moving vehicles.

Figure 1:
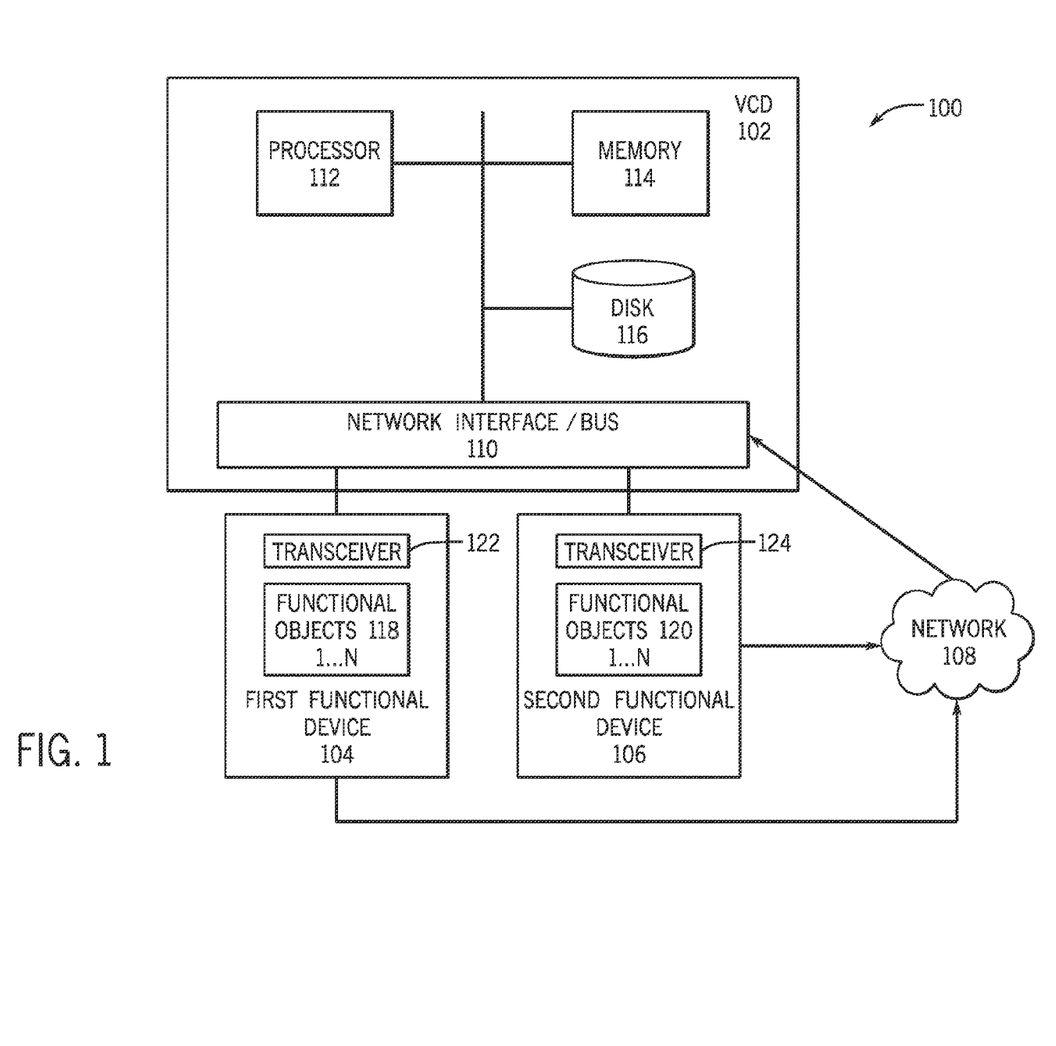
FIG. 1 is a block diagram of an illustrative operating environment for implementing systems and methods for controlling vehicle network functions with version control according to an exemplary embodiment.

Referring now to the drawings, wherein the showings are for purposes of illustrating one or more exemplary embodiments and not for purposes of limiting same, FIG. 1 is a block diagram of an illustrative a vehicle communication network system 100 (e.g., an exemplary operating environment) for implementing systems and methods for controlling vehicle network functions with version control according to an exemplary embodiment. The vehicle communication network system 100 can be implemented in a vehicle (not shown) or more than one vehicle, as will be discussed below with reference to FIG. 2. The components of the vehicle communication system 100, as well as the components of other systems, hardware architectures, and software architectures discussed herein, can be combined, omitted, or organized into different architectures for various embodiments.

More specifically, the vehicle communication system 100 can include a vehicle computing device (VCD) 102 (e.g., a control box, a head unit), a first functional device 104 and a second functional device 106, each of which are able to communicate via a network 108 and/or a network interface 110. To facilitate communication, the network interface 110 is operably connected for computer communication with the network 108, and the VCD 102 is operably connected for computer communication with the network interface 110.

The VCD 102 can perform various tasks and responsibilities in the vehicle communication network system 100 related to managing functional devices (e.g., the first functional device 104, the second functional device 106). In particular, the VCD 102 can include hardware, software, and combinations thereof to perform these tasks. Thus, the VCD 102 generally includes provisions for processing, communicating, and interacting with various components of a vehicle and other components of the system 100. In FIG. 1, the VCD 102 includes a processor 112, a memory 114, and a disk 116 each operably connected for computer communication via the network interface 110 and/or other wired and wireless technologies. The network interface 110 provides software and hardware to facilitate data input and output between the components of the VCD 102 and other components, networks, and data sources, which will be described herein. It is understood that the VCD 102 can include other computing and vehicle components not shown in FIG. 1.

As mentioned above, the VCD 102 can provide various functions to manage and enable communication with the functional devices (e.g., the first functional device 104, the second functional device 106) in the vehicle communication network system 100. The first functional device 104 and the second functional device 106 are generally configured to perform one or more functions other than the functions of the VCD 102. The functions can be related to the vehicle communication network system 100 of FIG. 1 and/or with other vehicle communication networks and vehicles, as will be discussed with FIG. 2 below.

For example, the first functional device 104 and the second functional device 106 can be systems in the vehicle. For example, the functional devices can be data sources or data sinks (e.g., an audio system, a video system, a digital versatile disc (DVD) player, a Blu-ray (BD) player, a rear entertainment seat system, a lighting system, a heating ventilation and air condition system, a navigation system, a radio receiver, a television receiver, a monitor, a telephone). In some embodiments, each functional device is an electronic media device. The vehicle communication network system 100 facilitated by the VCD 102 can enable communication associated with the system (e.g., functional devices) between the various systems, the vehicle, and in some embodiments, other vehicles and systems.

In FIG. 1, two functional devices are shown, however, it is understood that the systems and methods discussed herein can include any number of functional devices in various configurations. Further, it is understood that the functional devices described herein can include components and functions for processing, communicating, and interacting with various components of a vehicle and other components of the system 100, similar to the VCD 102 (e.g., a processor, a memory, a disk). As shown in FIG. 1, each functional device includes one or more functional objects. The first functional device 104 includes functional objects 118 and the second functional device 106 includes functional objects 120. In the embodiment shown in FIG. 1, the functional devices also include transceivers 122, 124 for receiving and transmitting data with the VCD 102 or other functional devices, via a wireless communication channel (e.g., the network 108).

The functional objects will now be described in more detail. The functional objects provide one or more functions to the functional device. The functional devices can include software and/or hardware to perform these functions (e.g., implemented by a processor or other components not shown). In some embodiments, which will be described in further detail herein, the functional object is modeled after a class and can include one or more features. For example, a BD (Blu-ray) class can include features to control the human machine interface (HMI) of a BD player (e.g., a functional device). An audio amplifier class can include features to control volume, bass, among others, of an AM/FM tuner (e.g., a functional device).

It is understood that the functional devices (e.g., the first functional device 104, the second functional device 106) can be implemented with any type of network. For example, a Media Oriented Systems Transport (MOST) network, an Ethernet network, a Flexray network, among others. Although some embodiments and examples discussed herein will refer to a MOST network, it is understood that the systems and methods discussed herein can be implemented with any time of network.

Figure 2:
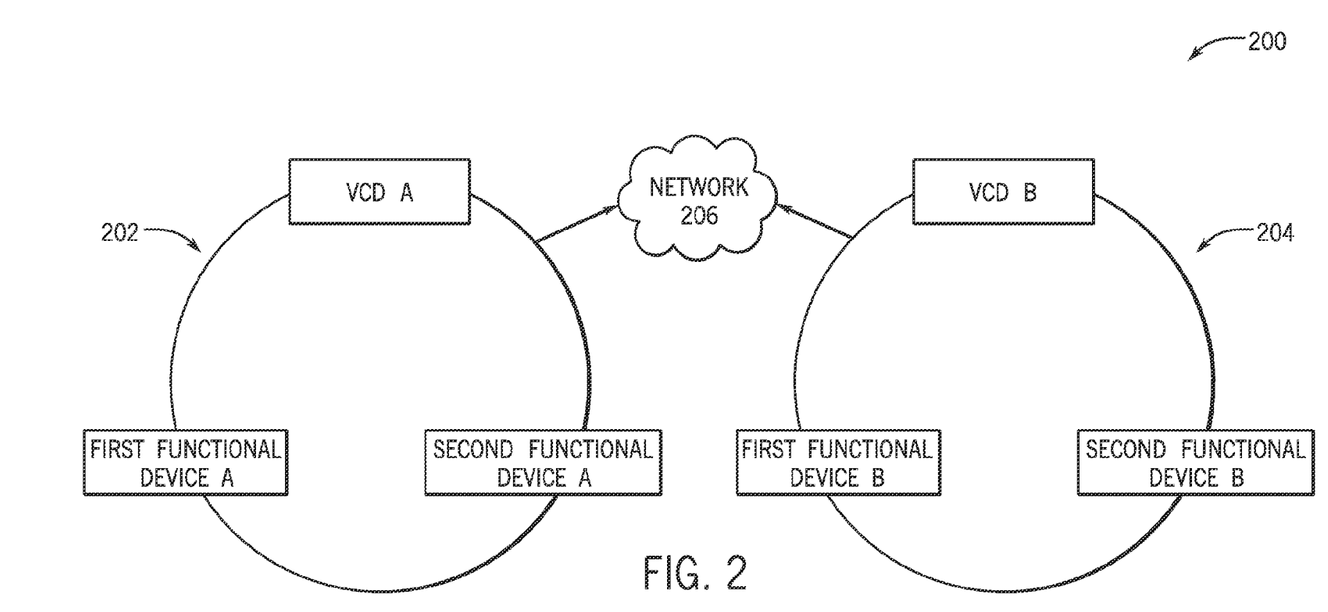
FIG. 2 is a block diagram of another illustrative operating environment for implementing systems and methods for controlling vehicle network functions with version control between two vehicle systems communicating over a network according to an exemplary embodiment.

The vehicle communication network system 100 can be implemented in a ring topology. For example, FIG. 2 illustrates another exemplary vehicle communication network system 200 for implementing systems and methods for controlling vehicle network functions with version control between two vehicle systems communicating over a network according to an exemplary embodiment. In this embodiment, a first network in a ring topology 202 can be implemented within a first vehicle (not shown) and a second network in a ring topology 204 can be implemented within a second vehicle (not shown). Similar to FIG. 1, the first network 202 includes a vehicle computing device A (VCD A), a first functional device A and a second functional device A. The second network 204 includes a vehicle computing device B (VCD B), a first functional device B and a second functional device B. The two networks can communicate with each other via a network 206. It is understood that the network can be configured into other topologies and can include various components (e.g., more than two networks, one or more than two functional devices).

Referring again to FIG. 1, in some embodiments, the functional objects are referred to as functional blocks. In some embodiments, the functional blocks are implemented in accordance with a specific network communication specification, for example MOST. Further, each functional block can be associated with the specific functional device. The functional block can be implemented in the software of the functional devices (e.g., in an application layer (not shown)). The functional blocks can communicate with other functional blocks, the VCD 102, and/or applications within the other functional blocks and VCD 102 via transceivers or other interfaces.

In one embodiment, the vehicle communication network system 100 of FIG. 1 implements one or more interfaces for each functional object of each functional device detected on the vehicle communication network. Each interface can be defined in a functional block framework stored on a memory. More specifically, the processor 112 can implement the interfaces according to a functional block framework stored in the memory 114. Each interface, as defined, includes a set of features. The set of features facilitate the functional objects in providing one or more functions to the functional device. Further, the features in each set of features is selected from a feature catalog defined in the framework. The feature catalog, in some embodiments, is an Extensible Markup Language (XML) file. For example, in accordance with the MOST specification, the feature catalog is a MOST feature catalog.

Figure 3:
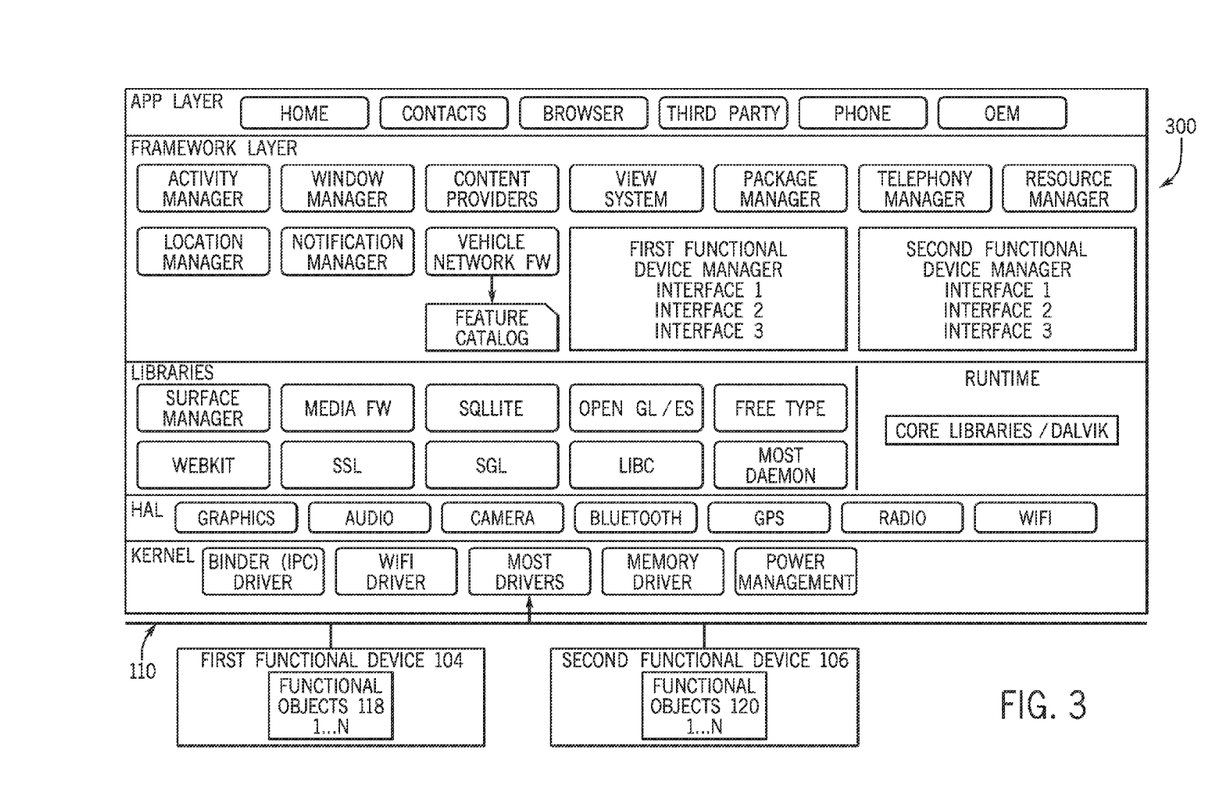
FIG. 3 is an exemplary system architecture of an operating system implementing an exemplary framework for controlling vehicle network functions with version control according to an exemplary embodiment.

Referring now to FIG. 3, an exemplary system architecture 300 of an operating system implementing an exemplary framework and interfaces for controlling vehicle network functions with version control according to an exemplary embodiment is shown. It is understood that the systems and methods described herein can be implemented with any system architecture and/or operating system, for example, Android, Windows, Linux, QNX, OSEK, among others. FIG. 3 will be described with reference to the systems and components of FIGS. 1 and 2, though it is understood that FIG. 3 can be used with other systems and components. Further, it is understood that the components of the system architecture shown in FIG. 3 can be combined, omitted and/or organized into different architectures for various embodiments.

Referring now to FIG. 3, the system architecture 300 includes an application layer, a framework lawyer (e.g., a middleware layer) that includes libraries and a runtime environment, a hardware abstraction layer (HAL) and a kernel layer. As mentioned above with FIG. 1, the system architecture 300, in some embodiments, can be stored in the processor 112 and/or memory 114 of the VCD 102. The first functional device 104 and the second functional device 106 interface with the system architecture 300 via the network interface/bus 110.

The application layer includes native applications and non-native applications (e.g., third party applications) that run on the VCD 102. Further, the application layer can include Original Equipment Manufacturer (OEM) applications specific to the vehicle implementing the VCD 102. For example, an OEM application can include an AM/FM Radio Application (not shown) that controls and communicates with an AM/FM Radio Tuner (e.g., a functional device). It is understood that the functional devices themselves can implement an application layer (not shown) including applications used for control and communication the VCD 102 and other functional devices.

The framework layer can include libraries, frameworks and runtime functions for operating the VCD 102, applications on the VCD 102 and communicating with the functional devices. As will be discussed in more detail herein, the framework layer can include functional block frameworks for controlling functional devices in the vehicle communication network system 100. As shown in FIG. 3, the framework layer includes a vehicle network framework, including a feature catalog, a first functional device manager, and a second functional device manager. The device managers can be associated with the functional device. As an illustrative example, the first function device manager can be a Tuner Manager for communicating and controlling the first functional device 104, an AM/FM Tuner. As another illustrative example, the second function device manager can be a BD Manager for communicating and controlling the second functional device 106, a BD player.

As can be seen in FIG. 3, the functional device managers include one or more interfaces. As discussed above, one or more interfaces can be provided for each functional object, and each interface is defined with a set of features. The set of features can be selected from the feature catalog defined in the framework. Thus, the functional device manager can be a class defining functions and features of the functional devices.

Figure 4A:
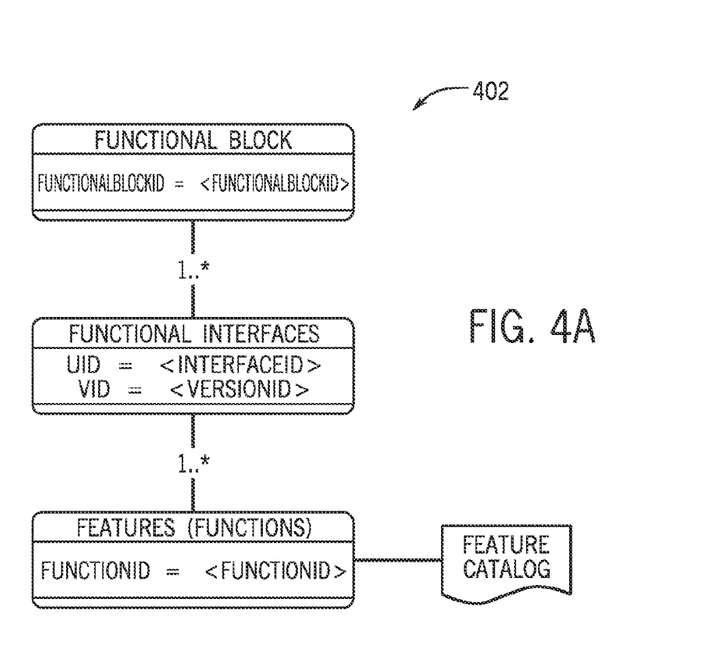
FIG. 4A is an exemplary object oriented diagram illustrating an exemplary organization of functional blocks and interfaces for controlling vehicle network functions with version control according to an exemplary embodiment.
Figure 4B:
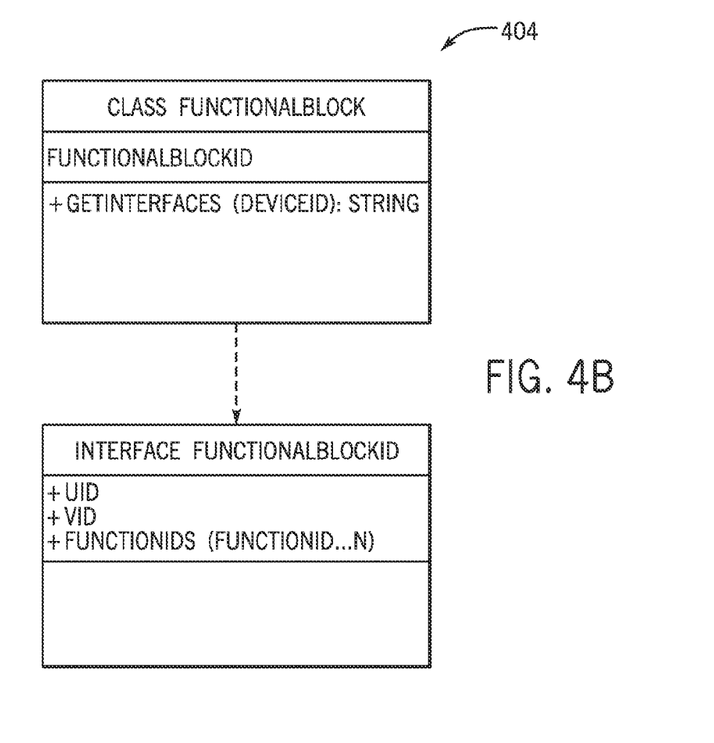
FIG. 4B is an exemplary Unified Modeling Language (UML) diagram class and interface description modeled according to the object oriented diagram of FIG. 4A according to an exemplary embodiment.

Referring now to FIGS. 4A and 4B, exemplary object oriented models for the functional device manager, functional objects and interfaces will be described. FIG. 4A is an exemplary object oriented diagram 402 illustrating an exemplary organization of functional blocks and interfaces for controlling vehicle network functions with version control according to an exemplary embodiment. As shown, a functional block can have one or more functional interfaces and each functional interface can have one or more features (e.g., functions selected from the feature catalog). Each functional block can be identified by a FunctionalBlockID. The FunctionalBlockID can be specified by the feature catalog. For example, in a MOST implementation, a functional block BD player can be identified by the FunctionalBlockID 0x34. Additionally, each functional interface is identified by an InterfaceID and a VersionID. The InterfaceID can be predefined within the framework. Further, each feature is identified by a FunctionID, which can be in accordance with the feature catalog. For example, a feature UpKey for controlling a BD player human machine interface (HMI) can be identified by the FunctionID 0x40A.

FIG. 4B is an exemplary Unified Modeling Language (UML) diagram class and interface description modeled according to the object oriented diagram of FIG. 4A according to an exemplary embodiment. As shown, the class FunctionalBlock can implement one or more interfaces. Again, each instance of the class FunctionalBlock can be identified by a FunctionalBlockID. Further, each instance of the interface FunctionalBlock can be identified by an InterfaceID (UID), a VersionID (VID) and include an array of FunctionIDs. Referring again to FIG. 3, the functional device managers can be modeled after the Class FunctionalBlock of FIG. 4B. Thus, the object oriented class allows access and control of a functional device in the vehicle communication network system 100.

Figure 5A:
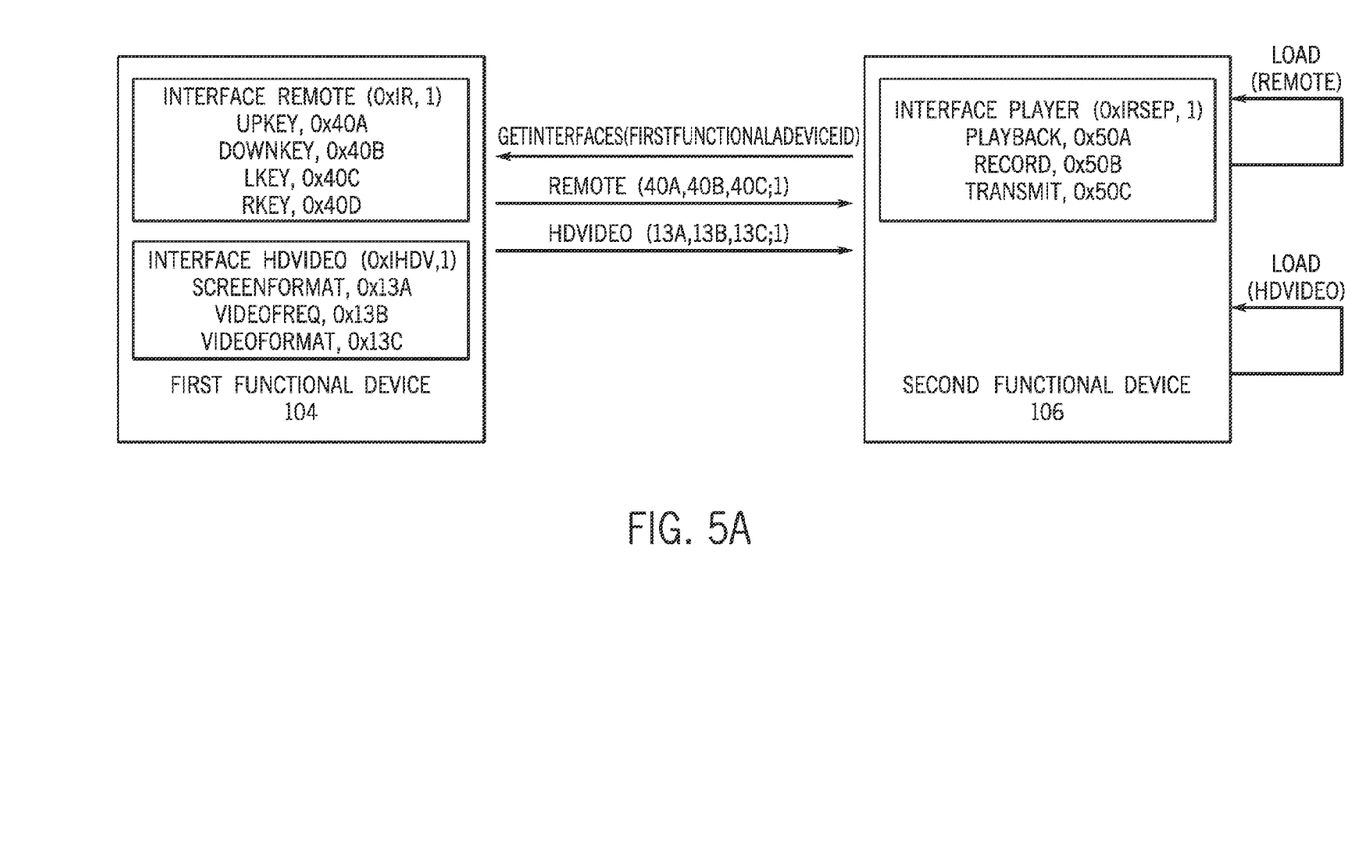
FIG. 5A is an exemplary data flow diagram illustrating exemplary communication via interfaces between a first functional device and a second functional device.

In one embodiment, the set of features are encapsulated to complete control of a function of the functional device. Said differently, the set of features are related and/or integral to implement control of a function of the functional device. Exemplary interfaces will now be discussed with reference to FIGS. 5A and 5B. FIG. 5A illustrates an exemplary data flow diagram illustrating exemplary communication via interfaces between a first functional device and a second functional device. In this example, the first functional device 104 is a BD player and the second functional device 106 is a Rear Seat Entertainment System. It is understood that this example is illustrative in nature and other types of functional devices and be implemented.

The first functional device 104 includes two exemplary interfaces, Interface Remote and Interface HDVideo. Each interface includes a set of features related and/or integral to implement control of a function of the functional device. For example, Interface Remote includes the features UpKey, DownKey, LKey and RKey, which are features that control remote human machine interface (HMI) actions of the first functional device 104 (e.g., the BD player). These features are related to one another and are integral to complete remote control of the HMI. The Interface HDVideo includes the features ScreenFormat, VideoFreq, and Video Format, which are features that control high definition video playback. Thus, these features are related to one another and are integral to facilitate high definition video playback.

Figure 5B:
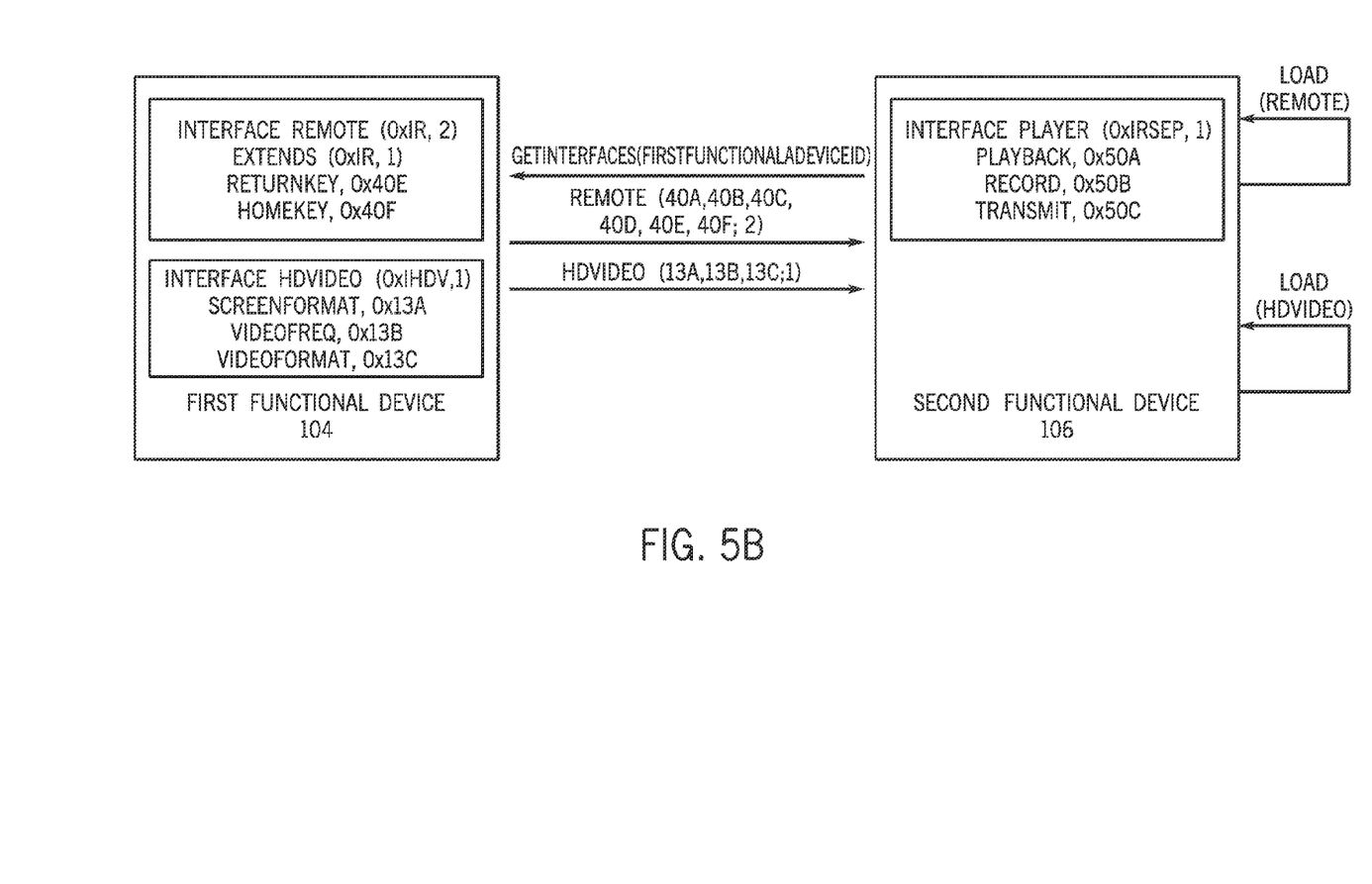
FIG. 5B is an exemplary data flow diagram illustrating exemplary communication via interfaces between a first functional device and a second functional device similar to FIG. 5A, but including an extended interface with version control.

As shown in FIG. 5A, each interface has an interface identification and a version identification. For example, Interface Remote is identified by InterfaceID 0xIR and VersionID 1. Interface HDVideo is identified by InterfaceID 0xIHDV and VersionID 1. As discussed herein, version control can be implemented using the interfaces. Referring now to FIG. 5B, an exemplary data flow diagram illustrating exemplary communication via interfaces between a first functional device and a second functional device similar to FIG. 5A is shown, but including an extended interface with version control. Specifically, Interface Remote with a VersionID of 2, is shown as extending Interface Remote with VersionID 1 and includes two new features, ReturnKey and HomeKey. Thus, Interface Remote with InterfaceID 0xIHDV and VersionID 2 includes the features of Interface Remote VersionID 1 through extension and includes two new additional features. Accordingly, the interfaces can be updated and the updated interfaces extend the previous interfaces.

Referring again to FIGS. 1-3, the processor can enable communication over the vehicle communication system 100 for the vehicle computing device 102 and the functional devices using the interfaces. Thus, the functional devices can communicate sets of features to one another via the interfaces. Referring again to FIGS. 5A and 5B, an exemplary communication between the first functional device 104 and the second functional device 106 will be described. As shown, the second functional 106 device transmits a request for the interfaces of the first functional device 104 as GetInterfaces(DeviceID). This method, as shown in FIG. 4B, can be defined in the Class FunctionalBlock. In other embodiments, this method and other methods requesting interface information, can be defined and executed by other applications, residing in the application layer of the architecture 300 (FIG. 3) or in the functional devices themselves (not shown).

In response to the request, the first functional device 104 returns the interfaces including the feature identifications (FunctionID) and interface version identification. The second functional device 106 can then load each interface as necessary. In another embodiment, the processor implements a new version of one or more interfaces. The new version extends the original interface. Thus, as shown in FIG. 5B, a similar process to FIG. 5A is shown, however, in this example, the first functional device 104 responds with another version (e.g., an updated version) of Interface Remote. In this embodiment, the second functional device can load the new version interface Remote. More specifically, the functional devices load control of features in the updated interfaces compatible with the version of the functional device. For example, the second functional device 106 may only support features of interface Remote version 1. However, since interface Remote version 2 extends the features of interface Remote version 1, the second functional device 106 can still load the updated version of interface Remote and operate using the original version. This allows for version control without compromising other units on the network that may not be compatible with updated features.

Figure 6:
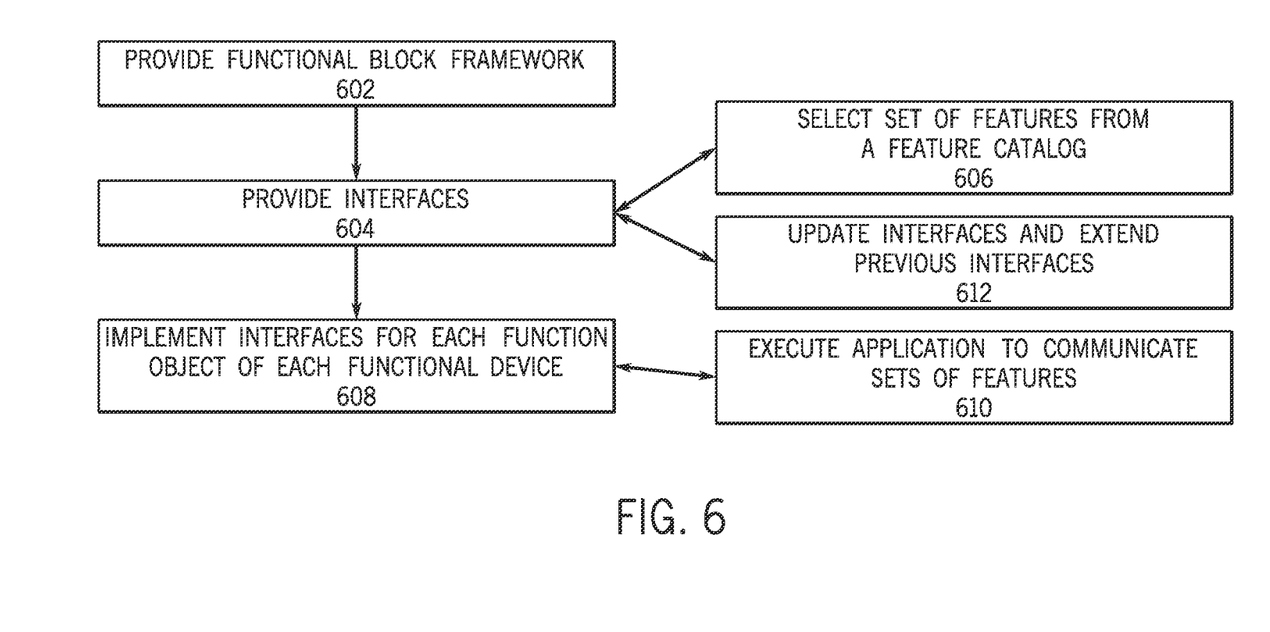
FIG. 6 is an exemplary process flow diagram of a method for controlling vehicle network functions with version control according to an exemplary embodiment.

Referring now to FIG. 6 a computer-implemented method is shown for controlling vehicle network functions with version control according to an exemplary embodiment. The method of FIG. 6 will now be described with reference to the systems and methods of FIGS. 1-4A, 4B, 5A, 5B, though it is to be appreciated that the method could be used with other systems and methods.

At block 602, the method includes providing a functional block framework at a vehicle computing device for controlling functional devices in a vehicle communication network system. As shown in FIGS. 1 and 2, the functional devices can include a first functional device 104 and a second functional device 106. Additionally, as shown in FIGS. 1 and 2, each functional device includes one or more functional objects. In one embodiment, the processor 112 of the VCD 102 provides the functional block framework. An exemplary functional block framework is shown in FIG. 3, for example, the first functional device manager and the second functional device manager.

At block 604, the method includes providing one or more interfaces for each functional object, wherein each interface is defined with a set of features. In one embodiment, the processor 112 of the VCD 102 provides the one or more interfaces. As shown in FIG. 3, the first functional device manager and the second functional device manager each include one or more interfaces. In some embodiments, each interface includes an identification and a version identification. For example, as shown in FIGS. 4A, 4B, 5A and 5B, an interface can have an InterfaceID and a VersionID.

In one embodiment, the set of features is selected from a feature catalog defined in the framework at block 606. For example, the processor 112 selects the set of features from a feature catalog stored in the framework layer of the system architecture 300 in FIG. 3. Thus, in one embodiment, the feature catalog can be defined in XML with all functions and parameters associated with functional blocks. Further, each feature in the set of features are integral to implement control of a function of the functional device. Said differently, the features are related to one another to implement control of a function of the functional device.

In one embodiment, providing one or more interfaces for each functional object further includes selecting each feature in the set of features from the feature control catalog based on a function of the functional device. The set of features are related to the function and are integral to implement control of the function. In some embodiments, the processor 112 can select each feature in the set of features and/or update the set of features based on a learning model over a period of time. For example, the processor 112 can select the features as each functional device is discovered based on the functional device, the version and the function of each interface. The features required by each functional device can change over time. Accordingly, the processor 112 can implement any type of computer machine learning model to select each feature in the set of features and/or update the set of features.

At block 608, the method includes implementing the interfaces for each function object of each function device in the vehicle network communication system to enable communication over the vehicle network communication system. Thus, control of the functional devices is implemented using the interfaces. For example, in one embodiment, at block 610, the method includes executing an application by the vehicle computing device to interface with the functional block framework and communicate sets of features between the vehicle computing device and the functional devices via the vehicle network communication system. As discussed above with reference to FIGS. 5A and 5B, the interfaces can be communicated between the VCD 102 and/or the functional devices using methods defined within the classes and/or other applications. The applications can be defined in the application layer of the architecture 300 and/or in the application layer of the functional devices (not shown).

Further, at block 612, the method includes updating an interface, wherein the updated interface extends the previous interface. The functional devices load control features in the updated interfaces compatible with the version of the functional device. As discussed above with reference to FIG. 5B, the processor (e.g., the processor 112 of FIG. 1) implements a new version of one or more interfaces. The new version extends the original interface. In FIG. 5B, Interface Remote with a VersionID of 2, is shown as extending Interface Remote with VersionID 1 and includes two new features, ReturnKey and HomeKey. Thus, Interface Remote with InterfaceID 0xIHDV and VersionID 2 includes the features of Interface Remote VersionID 1 through extension and includes two new additional features. Accordingly, the interfaces facilitate communication and version control between functional devices and vehicles.

The embodiments discussed herein may also be described and implemented in the context of non-transitory computer-readable storage medium storing computer-executable instructions. Non-transitory computer-readable storage media includes computer storage media and communication media. For example, flash memory drives, digital versatile discs (DVDs), compact discs (CDs), floppy disks, and tape cassettes. Non-transitory computer-readable storage media may include volatile and nonvolatile, removable and non-removable media implemented in any method or technology for storage of information such as computer readable instructions, data structures, modules, or other data. Non-transitory computer readable storage media excludes transitory and propagated data signals.

It will be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for controlling vehicle network functions and version control, comprising:

providing a functional block framework at a vehicle computing device for controlling functional devices in a vehicle communication network system, wherein each functional device includes one or more functional objects;

providing an original interface having a first version identification for at least one functional object of a first functional device, wherein the original interface is defined with a first set of features with one or more features selected from a feature catalog defined in the functional block framework;

implementing the original interface in the vehicle communication network system to enable communication over the vehicle communication network system;

updating the original interface thereby creating an updated interface having a second version identification and including a second set of features that includes the first set of features through extension, and one or more additional features selected from the feature catalog that are not included in the first set of features, such that the updated interface extends the original interface;

loading the updated interface to a second functional device that is compatible with the original interface and supports the first set of features, but does not support the one or more additional features, wherein, even though the second functional device does not support the one or more additional features, the second functional device still loads the updated interface because the updated interface extends the first set of features of the original interface; and controlling the second functional device using the updated interface wherein the second functional device operates using the first set of features in the updated interface and not using the one or more additional features.

2. The computer-implemented method of claim 1, wherein the one or more features in the first set of features and the one or more additional features are integral to implement control of a function of the first functional device.

3. The computer-implemented method of claim 1, wherein the feature catalog defines XML functions and parameters associated with the one or more functional objects.

4. The computer-implemented method of claim 1, wherein the original interface includes an interface identification.

5. The computer-implemented method of claim 1, wherein providing the original interface further includes selecting the one or more features in the first set of features from the feature catalog based on a function of the first functional device, wherein the first set of features are related to the function and are integral to implement control of the function.

6. The computer-implemented method of claim 1, further including executing an application by the vehicle computing device to interface with the functional block framework and communicate sets of features between the vehicle computing device and the functional devices via the vehicle network communication system.

7. A system for controlling vehicle network functions and version control, comprising:
a vehicle communication network including a first functional device and a second functional device, wherein the first functional device and the second functional device each include one or more functional objects;
a network interface operably connected for computer communication with the vehicle communication network; and
a vehicle computing device operably connected for computer communication with the network interface, the vehicle computing device including a processor and a memory, wherein the processor:
implements one or more interfaces for each functional object of the first functional device and the second functional device detected on the vehicle communication network, wherein the one or more interfaces are defined according to a functional block framework stored on the memory, and each of the one or more interfaces includes a set of features, each feature in the set of features selected from a feature catalog defined in the functional block framework;
enables communication over the vehicle communication network for the vehicle computing device, the first functional device, and the second functional device using the one or more interfaces, wherein the first functional device and the second functional device communicate sets of features to one another via the one or more interfaces; and
updates an original interface of a functional object of the first functional device thereby creating an updated interface, wherein the updated interface includes an updated set of features that includes an original set of features from the original interface through extension, and an additional feature not included in the original set of features, such that the updated interface extends the original interface, and
loads the updated interface to the second functional device, which is compatible with the original interface and supports the original set of features, but does not support the additional feature, wherein even though the second functional device does not support the additional feature, the second functional device still loads the updated interface because the updated interface extends the original set of features of the original interface.

8. The system of claim 7, wherein the set of features are encapsulated to complete control of a function of the first functional device or the second functional device.

9. The system of claim 8, wherein each feature in the set of features are related to the function to execute the function.

10. The system of claim 8, further including the processor selecting each feature in the set of features based on the function and a learning model of a period of time.

11. An object oriented software architecture encoded on a non-transitory computer readable medium for controlling vehicle network functions and version control, the object oriented software architecture including at least an application layer and an application framework layer, the object oriented software architecture comprising:
an object oriented class allowing access and control of a functional device in a vehicle communication network system, the vehicle communication network system interfacing with the object oriented software architecture and the vehicle communication network system including more than one functional device;
a plurality of interfaces implemented by the object oriented class,
wherein each interface is defined with a set of features, the set of features selected from a feature catalog in a set of libraries of the object oriented software architecture, wherein a first interface of the plurality of interfaces can include one or more versions, wherein a later version of the first interface includes a previous set of features from a previous version of the first interface along with an additional feature not included in the previous set of features, such that the later version extend the previous version, wherein the later version is loaded by a second interface of the plurality of interfaces that is compatible with the previous version and supports the previous set of features, but does not support the additional feature;

wherein, even though the second interface does not support the additional feature, the second interface still loads the later version because the later version extends the previous set of features from the previous version; and one or more applications enabling communication between the functional device and other functional devices using the interfaces via the object oriented class.

12. The object oriented software architecture of claim 11, wherein each feature in the set of features are integral to implement control of a function of the functional device.

13. The object oriented software architecture of claim 11, wherein the set of features selected are selected from the feature catalog based on a function of the functional device, wherein the set of features are related to the function and are integral to implement control of the function.

* * * * *